United States Patent
Cho et al.

(10) Patent No.: US 6,693,680 B1
(45) Date of Patent: Feb. 17, 2004

(54) PRINTED CIRCUIT BOARD (PCB) BRACKET FOR A MONITOR

(75) Inventors: Nam-Il Cho, Suwon (KR); Kyung-Kyun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 09/635,564

(22) Filed: Aug. 10, 2000

(30) Foreign Application Priority Data

Oct. 19, 1999 (KR) ........................................ 1999/45400

(51) Int. Cl.[7] ................................................. H04N 5/64
(52) U.S. Cl. ....................................................... 348/836
(58) Field of Search ................................ 348/739, 825, 348/836–846; 361/759; 312/7.2; 284/349.1; H04N 5/64

(56) References Cited

U.S. PATENT DOCUMENTS

| | | |
|---|---|---|
| 4,338,635 A | 7/1982 | Haider et al. |
| 4,590,540 A | 5/1986 | Nicholson et al. |
| 4,646,159 A | 2/1987 | Beaumont et al. |
| 5,419,626 A * | 5/1995 | Crokett ........................ 312/7.2 |
| 5,575,545 A | 11/1996 | Wang |
| 5,745,348 A | 4/1998 | Cha |
| 5,844,635 A | 12/1998 | Kim |
| 5,863,106 A * | 1/1999 | Beak ........................... 312/7.2 |
| 5,900,920 A | 5/1999 | Lee et al. |
| 5,963,275 A | 10/1999 | Cho |
| 5,969,776 A * | 10/1999 | Han ............................ 348/836 |
| 5,973,916 A * | 10/1999 | Han ............................ 361/682 |
| 6,018,375 A * | 1/2000 | Lim ............................ 348/829 |
| 6,034,745 A | 3/2000 | Cho |
| 6,135,411 A * | 10/2000 | Shirasawa ................. 248/349.1 |
| 6,233,026 B1 * | 5/2001 | Kim et al. ................... 348/836 |
| 6,288,759 B1 * | 9/2001 | Cho et al. ................... 348/836 |
| 6,370,031 B2 * | 4/2002 | Park et al. ................... 361/759 |

* cited by examiner

*Primary Examiner*—C Kelley
*Assistant Examiner*—Tung Vo
(74) *Attorney, Agent, or Firm*—Robert E. Bushnell, Esq.

(57) ABSTRACT

A printed circuit board (PCB) bracket for a monitor has a bottom plate including a corrugated part formed at a predetermined portion of the bottom plate and preventing a deformation by a vertical external force, a front plate formed at the front of the above corrugated part and folded vertically against the bottom plate, a pair of protruding plates protruding from both sides of the front plate and including respective connecting hole, a pair of side plates formed extensively at both sides of the bottom plate, including a securing protuberance formed at a position corresponding to the above connecting hole and connecting protuberance formed at a predetermined portion, and a rear plate formed at the back side of the bottom plate and folded vertically. In the case that the front, side and rear plates folded against the bottom plate are assembled, there is a prevention of a vertical deformation through the corrugated part, prevention of the front plate from overturning frontwards by the securing protuberance inserted and folded into each of connecting holes of a pair of the protruding plates, and prevention of the outside part of the protruding plates from overturning sidewards by being blocked on the inner side of the connecting protuberance.

22 Claims, 7 Drawing Sheets

PRINTED CIRCUIT BOARD (PCB) BRACKET FOR A MONITOR

CLAIM OF PRIORITY

This application makes reference to, incorporates the same herein, and claims all benefits accruing under 35 U.S.C. §119 from an application entitled P.C.B Bracket of Monitors earlier filed in the Korean Industrial Property Office on Oct. 19, 1999, and there duly assigned Serial No. 99-45400 by that Office.

BACKGROUND OF THE INVENTION

1. Field of the Invention

The present invention relates to a printed circuit board (PCB) bracket for a monitor, more particularly, to a printed circuit board bracket for a monitor of which the strength is increased by improving a structure thereof and the deformation by the weight of a monitor can be prevented.

2. Description of the Related Art

Generally, a monitor is an apparatus displaying variable video such as letters, signs and figures by using lights of different brightness and color. The lights are produced by outputting an electron beam from an electron gun of a cathode-ray tube by a video signal and hitting a fluorescence material on a cathode-ray tube.

A monitor includes a printed circuit board (hereinafter referred as PCB) controlling electronically the monitor. The PCB is placed in a bracket having an appropriate intensity so that the bracket prevents the PCB from getting damaged by an external impact. Therefore, the PCB can control the monitor in a stable state.

Accordingly, there is a problem where the monitor is operated in an unstable state in the case that the excessive weight affects a monitor and causes deformation or other damage to the PCB bracket.

Exemplars of the art, U.S. Pat. No. 6,034,745 for Monitor Shell issued to Cho, U.S. Pat. No. 5,844,635 for Cathode Ray Tube Mounting Structure issued to Kim, U.S. PAT. No. 5,963,275 for Device for Fixing Video Circuit of monitor issued to Cho, U.S. Pat. No. 4,646,159 for Unitary CRT Display Assembly issued to Beaumont et al., U.S. Pat. No. 5,745,348 for Printed Circuit Board Coupling Device for Use with a Cathode Ray Tube issued to Cha, U.S. Pat. No. 4,590,540 for Circuit Board Mounting Arrangement issued to Nicholson et al., U.S. Pat. No. 4,338,635 for Cathode Ray Tube Monitor issued to Haider et al., U.S. Pat. No. 5,575,545 for Monitor Shell issued to Wang, and U.S. Pat. No. 5,900,920 for Apparatus for Affixing a Printed Circuit Board in a Monitor issued to Lee et al. disclose methods and apparatus for mounting a printed circuit board within a monitor. I have found that none of the art show a printed circuit board mounting structure in a monitor that can withstand a fair amount of force from all directions.

SUMMARY OF THE INVENTION

Therefore, an object of the present invention is to provide a PCB bracket for a monitor which can be operated in a stable state by improving a structure of the PCB bracket in order to prevent deformation and damage.

It is another object to have a PCB to prevent damage to the electronic components of the PCB when there is an external impact to the monitor.

It is yet another object to have a bracket for protecting the printed circuit board of a monitor when transporting the monitor.

It is still yet another object to have a bracket that will be easily installed to support a monitor's PCB.

To achieve the above object, a PCB bracket which has a bottom plate including a corrugated part formed at a predetermined portion thereof and preventing a deformation caused by vertical external force, a front plate formed integrally at the front of the above corrugated part and folded vertically against the bottom plate, a pair of protruding plates projecting from both sides of the front plate and including respective connecting holes, a pair of side plates formed extensively at both sides of the bottom plate, including a securing protuberance formed at a place corresponding to the above connecting holes of a front edge and a connecting protuberance formed at a predetermined portion, and a rear plate formed at the back side of the bottom plate and folded vertically, in case the front, side and rear plates folded against the bottom plate are assembled. The bracket prevents a vertical deformation through the corrugated part, prevents the front plate from overturning forward by the securing protuberance inserted and folded into each of the connecting holes of a pair of the protruding plates, and prevents the outside part of the protruding plate from overturning sidewards by being blocked on the inner side of the connecting protuberance.

According to a preferable embodiment of the present invention, the corrugated part formed as a predetermined height maintains the vertical intensity when the front plate is pulled backwards.

Also, the connecting protuberance of a pair of the side plates is protruded from an edge of a hole formed at a predetermined portion of each one of the side plates and a predetermined space is formed between the connecting protuberance and a pair of the side plates.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PRESENT INVENTION

Figure 1:
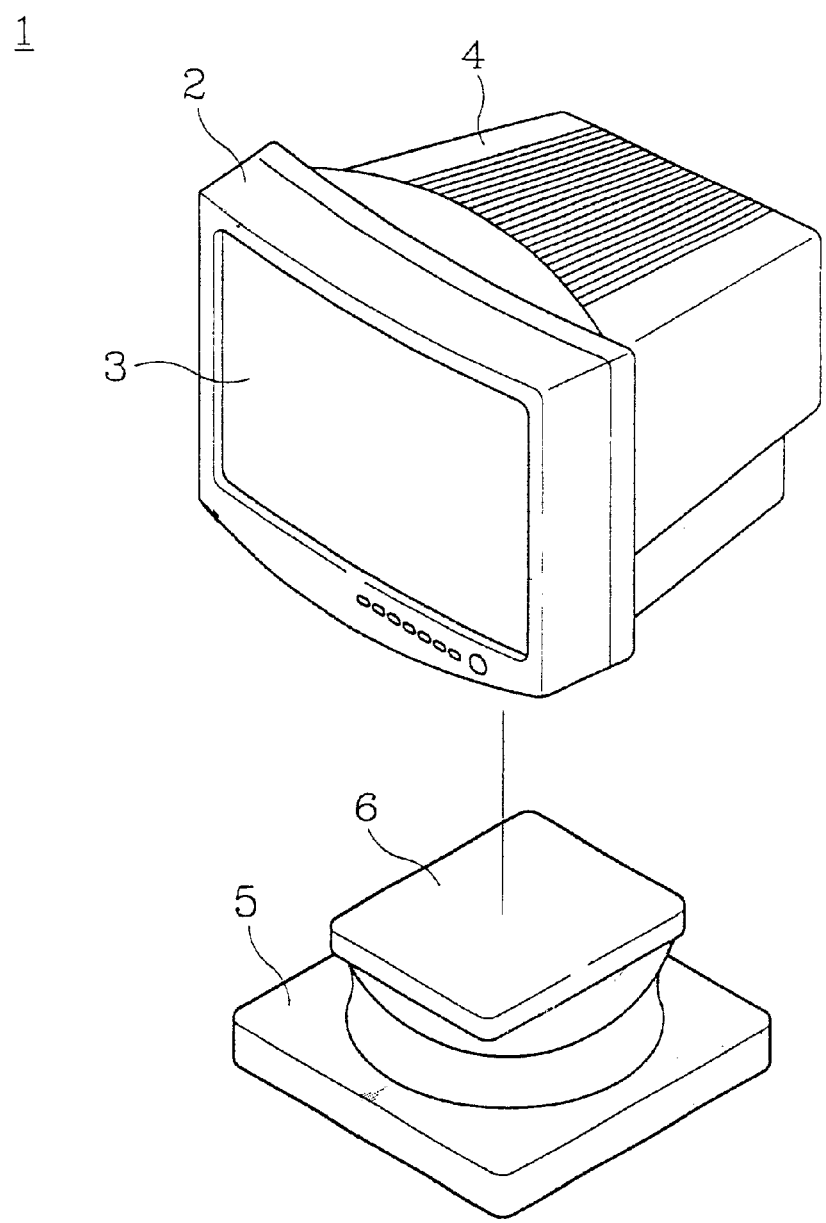
FIG. 1 is a perspective view illustrating a monitor including a PCB bracket.

Turning now to the drawings, as shown in FIG. 1, a monitor 1 has a front case 2, a cathode-ray tube 3 equipped with the front case 2 and displaying letters or signs and a rear cover 4 connected to the front case 2 and forming the exterior of the monitor.

Figure 2:
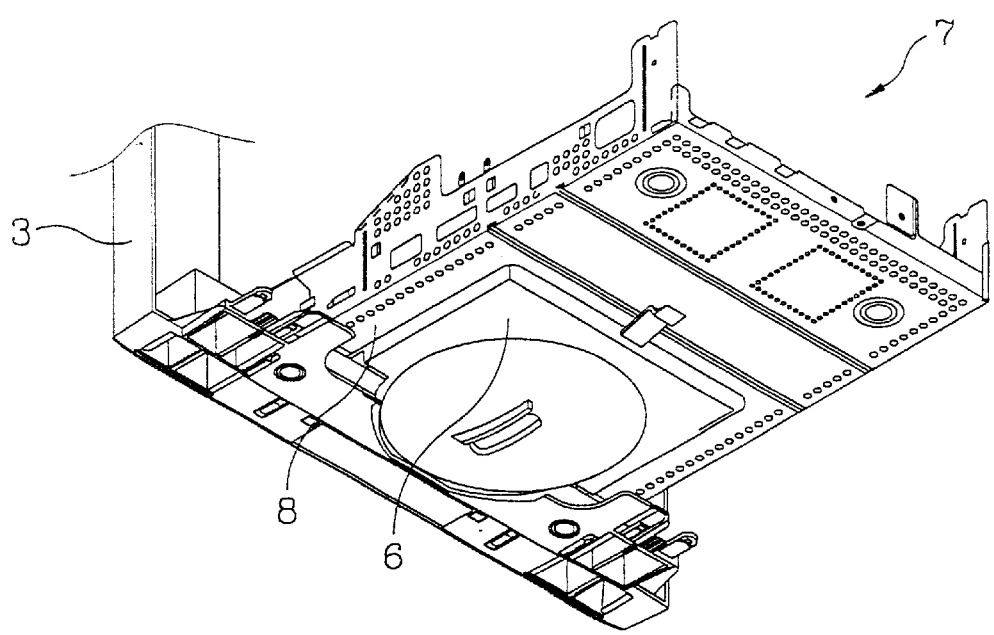
FIG. 2 is a perspective view illustrating a bottom side of a PCB bracket connected to a monitor.

A top plate 6 formed rotatably at the upper part of a stand 5, supports the bottom of the rear cover 4, and preferably the bottom 8 of the PCB bracket 7 shown in FIG. 2.

Accordingly, the monitor 1 can swivel and tilt on the stand 5. Referring FIG. 2, it will be explained in the details of the connection of the PCB bracket, stand and front case. As shown in FIG. 2, the PCB bracket 7 is in the shape of a hexahedron including a PCB (not shown) placed in the interior of the PCB bracket 7 and controlling the monitor 1. A front plate of the PCB bracket 7 is connected to a front case 3 by a connecting member such as a screw.

Also, the top plate 6 of the stand 5 supports the bottom 8 of the PCB bracket. Thus, the weight of the monitor 1 leans downwards and the weight is transmitted to the stand 5. The weight of the monitor 1 affects the PCB bracket 7 since the stand 5 supports the bottom of the PCB bracket 7.

Figure 3:
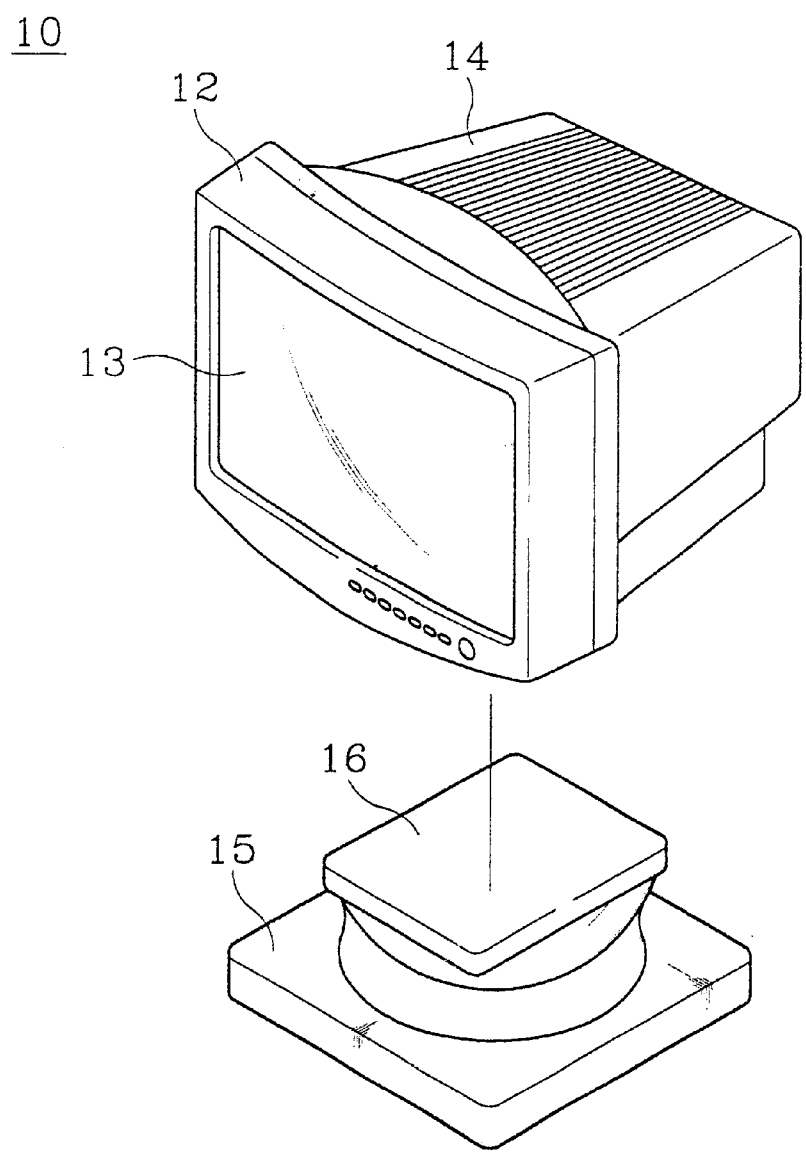
FIG. 3 is a perspective view illustrating a monitor including a PCB bracket according to a preferable embodiment of the present invention.
Figure 4:
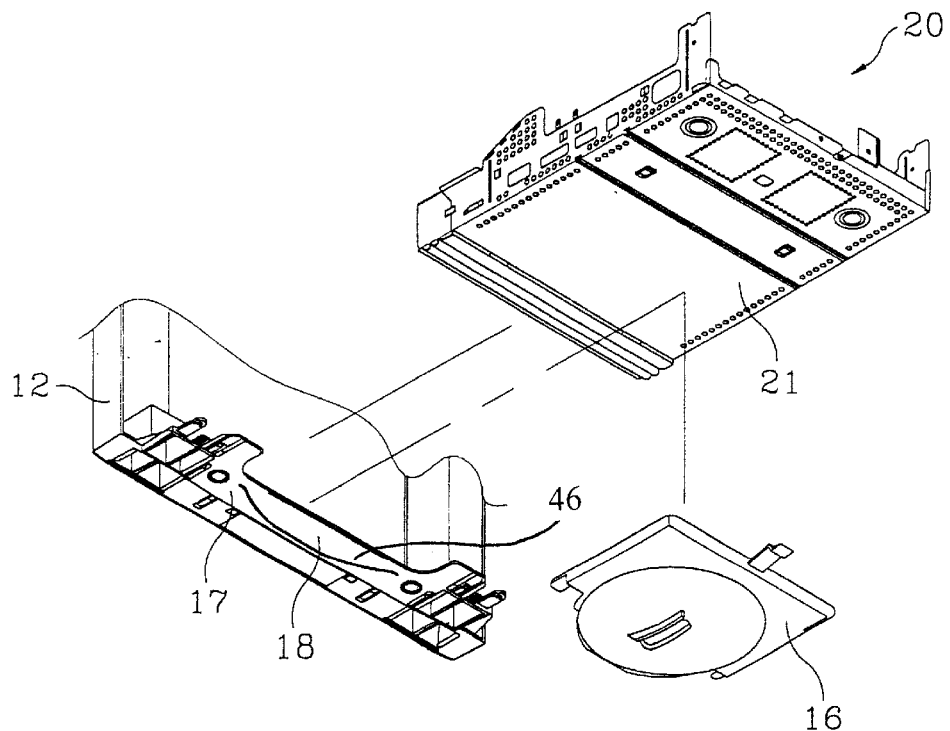
FIG. 4 is an exploded perspective view illustrating the connection of PCB bracket, front case and stand.
Figure 5:
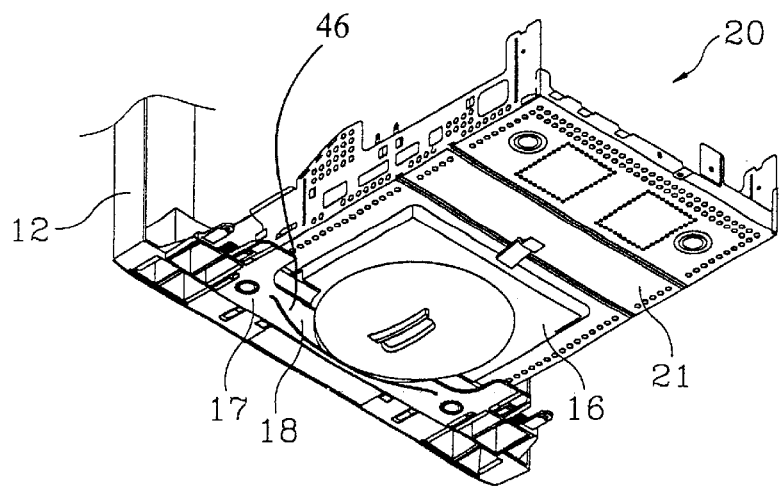
FIG. 5 is a perspective view illustrating the connected state of the PCB bracket, front case and stand.

As shown in FIGS. 3, 4 and 5, a monitor 10 has a front case 12, a cathode-ray tube 13 connected to the front case 12 and displaying letters or signs, and a rear cover 14 connected to the front case 12 and forming the exterior.

In the monitor 10, an upper plate 16 is connected rotatably and tiltably to the top of a stand 15, supports the bottom side of the rear cover 14, and preferably the bottom side of a PCB bracket. The front side of the upper plate 16 contacts with the bottom side of a supporting part 18 protruding backwards from the bottom side of the front case 12. The supporting part 18 has a recessed portion 46 and a flat portion 17.

Accordingly, the stand 15 supports a bottom side 21 of the PCB bracket 20 and simultaneously the bottom side of the supporting part 18 that is attached to the front case 12 so that the weight affecting to the PCB bracket 20 is dispersed and the stand 15 stably supports the monitor 10. A structure of the PCB bracket will be described in detail with reference to FIGS. 6 and 7.

Figure 6:
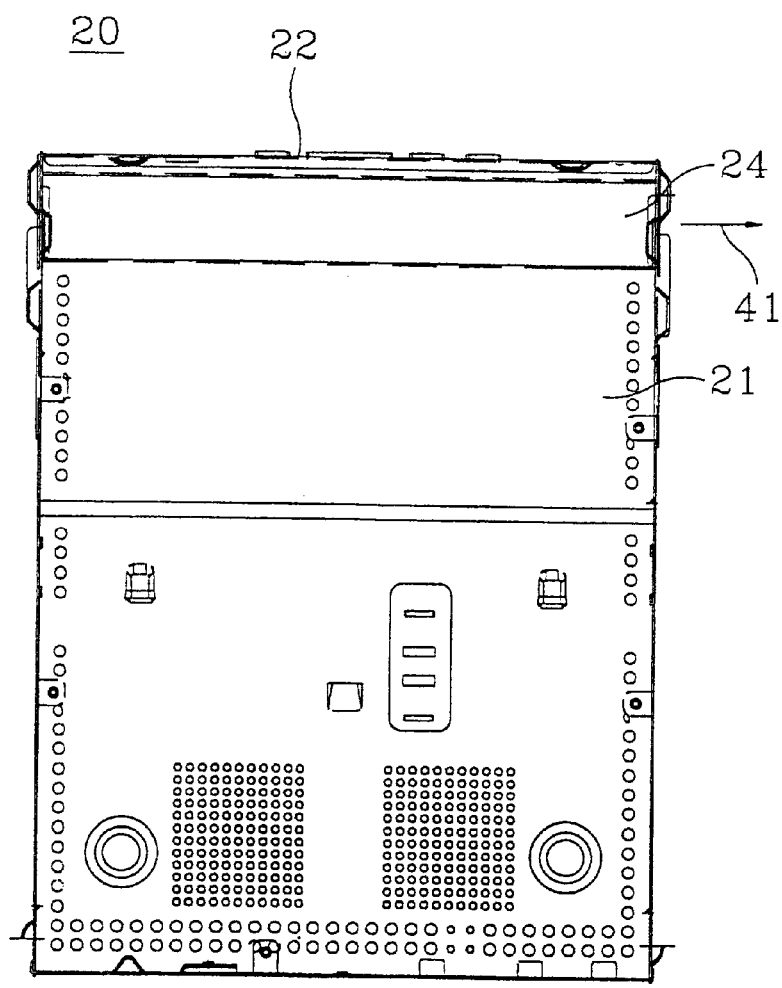
FIG. 6 is a development figure illustrating a structure of a PCB.
Figure 7:
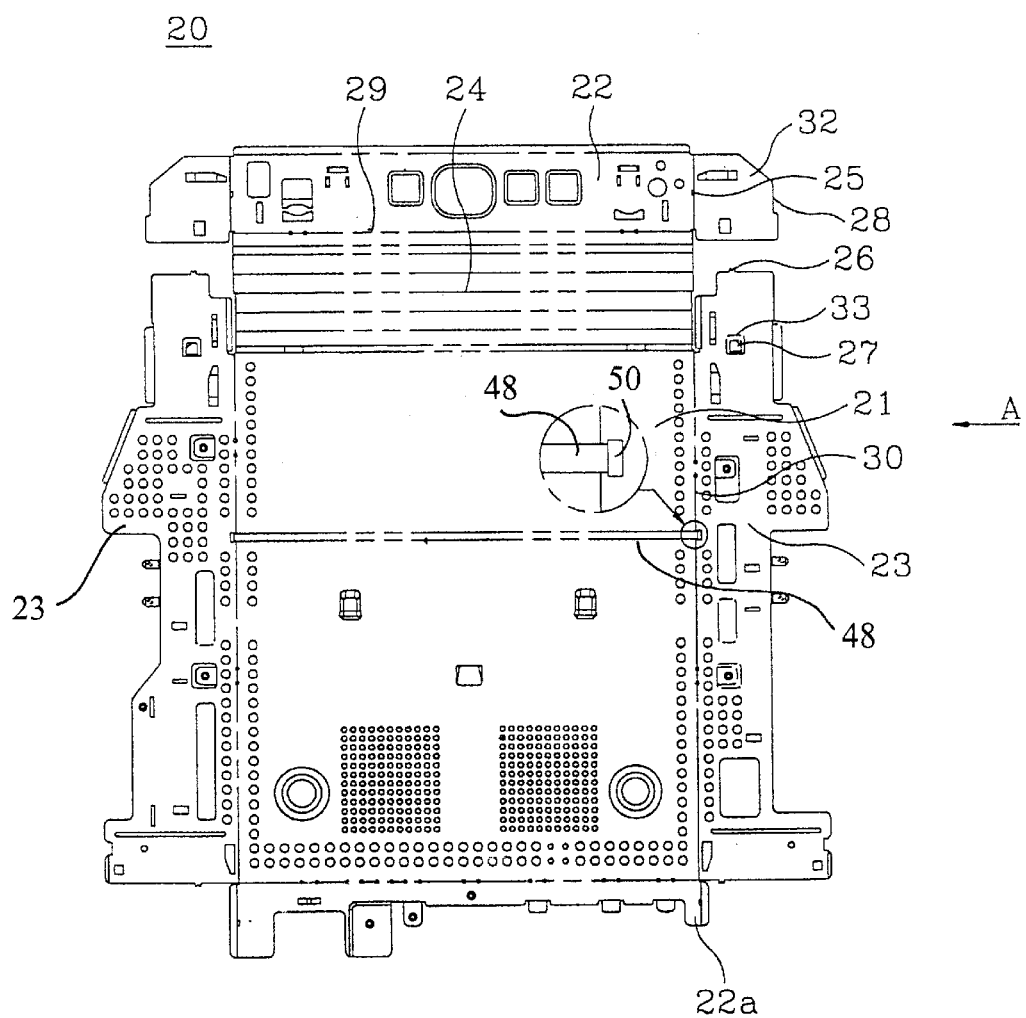
FIG. 7 is an unassembled view illustrating a bottom side of a PCB bracket shown in FIG. 6.

As shown in FIGS. 6 and 7, the PCB bracket 20 has a bottom plate 21 in a rectangular shape, side plates 23 formed integrally at both sides of the bottom plate 21, a front plate 22 formed integrally at the front of the bottom plate 21, and a back plate 22a formed at the back of the bottom plate 21. The PCB bracket 20 is assembled in a hexahedral shape by folding each part of the PCB bracket 20 along a predetermined line. A corrugated part 24 is formed between the bottom plate 21 and the front plate 22. And the corrugated part 24 can be formed by a process such as plastic working.

Figure 8:
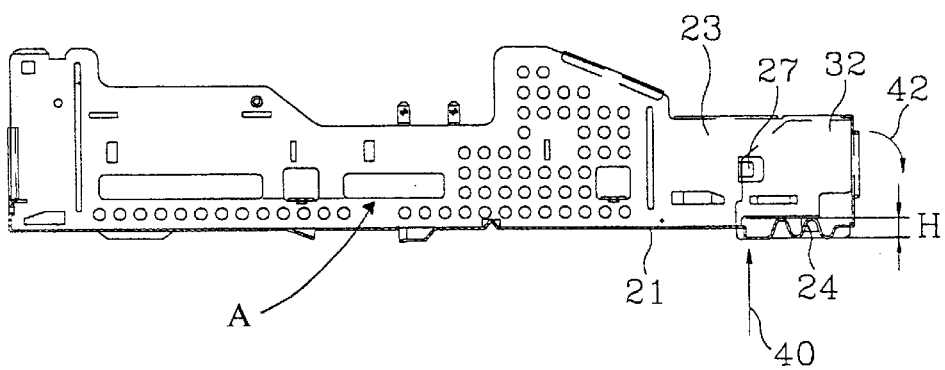
FIG. 8 is a side view of an assembled PCB bracket showing area A of FIG. 7.

As shown in FIG. 8, the corrugated part 24 has wrinkle shapes (parallel grooves with ridges) having a predetermined height H. Therefore, it maintains enough intensity for the external force from the direction of an arrow 40, preferably, the weight of the monitor 10.

Referring FIGS. 6 and 7, the front plate 22 of the PCB bracket 20 is folded upwards and vertically to the bottom plate 21 along the first boundary line 29. A protruded plate 32 is formed at both sides of the front plate 22 and a connecting hole 25 of a predetermined size is formed in each protruded plate 32.

At the center of the bottom plate 21, a bead 48 for intensifying a bending rigidity traverses a width of the bottom plate 21. A punched hole 50 is formed in the shape of a rectangle on both ends of the bead 48 for folding the side plate 23.

The side plate 23 of the PCB bracket 20 is folded upwards and vertically to the bottom plate 21 along the second boundary 30. A hole 33 is formed at each front part of the side plate 23 and a connecting protuberance 27 is protruded from each hole 33. Accordingly, when the front plate 22 and both side plates 23 are folded vertically along the first and second boundary lines 29 and 33 respectively, and the front plate 22 is pulled backwards, the wrinkles are formed upward and downward in the corrugated part 24 and the front plate 22 is pulled at a portion for assembling.

At this time, the connecting hole 25 of the protruded plate 32 is moved to a position corresponding to a securing protuberance 26 formed at an edge of the front of both side plates 23. The securing protuberance 26 is inserted into the connecting hole 25 and an end portion of the securing protuberance 26 is folded so that the front plate 22 is connected to the side plate 23. Therefore, the front plate 22 is prevented from overturning in the direction of the arrow 42 shown in FIG. 8.

Also, when the securing protuberance 26 is connected to the connecting hole 25, one side 28 of the protruded plate 32 is moved to a position corresponding to the connecting protuberance 27 of the side plate 23. One side 28 of the protruded plate 32 is caught on the inner side of the connecting protuberance 27. Therefore, the protruded plate 32 is prevented from overturning sidewards in the direction of the third arrow 41.

In the result, the PCB bracket 20 including the corrugated part 24 has enough bearing power to support the external force in the direction of the first arrow 40, preferably the weight of the monitor 10.

The front plate 22 is prevented from overturning frontwards in the direction of the second arrow 42 by the securing protuberance 26 inserted and secured in the connecting hole 25, and also from overturning sidewards in the direction of the third arrow 41 by one side of the protruded plate 32 caught on the inner side of the connecting protuberance 27.

Accordingly, the above PCB bracket has enough bearing power against the external force in the direction of vertical, right and left, front and rear. As stated above, a PCB bracket according to the present invention increases the structural intensity by including a corrugated part, a securing protuberance and a connecting protuberance so that the PCB bracket has an advantage of preventing the deformation thereof. Although the preferred embodiment of the present invention has been described, it will be understood by those skilled in the art that the present invention should not be limited to the described preferred embodiment, but various changes and modifications can be made within the spirit and scope of the invention as defined by the appended claims.

What is claimed is:

1. A printed circuit board bracket for a monitor, comprising:

a bottom plate having a corrugated part formed at a predetermined portion of said bottom plate and preventing a deformation of the bracket by a vertical external force;

a front plate formed at the front of the corrugated part and folded vertically against said bottom plate;

a protruding plate projecting from a side of the front plate and including a first hole;

a side plate formed on a side of said bottom plate, said side plate having a securing protuberance formed on a position corresponding to the first hole and a connecting protuberance formed at a predetermined portion of said side plate; and a rear plate formed at a back side of said bottom plate and folded vertically, said front, side and rear plates being assembled by being folded against said bottom plate and preventing a vertical deformation through the corrugated part, preventing said front plate from overturning frontwards by said securing protuberance inserted and folded into the first hole of said protruding plate, and preventing an outside part of said protruding plate from overturning sidewards by being blocked on an inner side of said connecting protuberance.

2. The printed circuit board bracket of claim 1, with the corrugated part having a predetermined height and maintaining a vertical intensity when said front plate is pulled backwards.

3. The printed circuit board bracket of claim 1, with the connecting protuberance of said side plate protruding from an edge of a second hole formed at a predetermined part of said side plate and a predetermined space being formed between the connecting protuberance and said side plates.

4. The printed circuit board bracket of claim 1, further comprising a second side plate formed on a side of said bottom portion opposite said side plate, said second side plate having a shape matching said side plate, with said front, side, second side, and rear plates forming a hexahedral shape by being folded against said bottom plate.

5. The printed circuit board bracket of claim 1, further comprising an upper plate connected rotatably and tiltably to a top of a stand of the monitor and supporting a bottom side of a rear cover of the monitor and said bottom plate.

6. The printed circuit board bracket of claim 1, with said upper plate having a front side contacting with a bottom side of a front case of the monitor, the front case enclosing the monitor by being connected with the rear cover.

7. An apparatus accommodating a printed circuit board, comprising:

a bottom plate supported by a stand of a monitor, said bottom plate having a corrugated part on said bottom plate, the monitor displaying variable video and being encased by a front cover connected to a rear cover forming an exterior to the monitor;

a front plate folded upwards and vertically with respect to said bottom plate along a second boundary line on said bottom plate, a first hole formed on a front portion of said side plate;

a protruding plate being formed at both sides of said front plate and a second hole of a predetermined size being formed in said protruding plate;

a side plate folded upwards and vertical with respect to said bottom plate along a second boundary line of said bottom plate, a third hole formed at a front part of the side plate and a connecting protuberance protruding from the third hole; and a rear plate formed at the back side of said bottom plate and folded vertically with respect to said bottom plate.

8. The apparatus of claim 7, further comprising an upper plate connected rotatably and tiltably to a top of a stand of the monitor and supporting a bottom side of a rear cover of the monitor and said bottom plate.

9. The apparatus of claim 8, with said upper plate having a front side contacting with a bottom side of a front case of the monitor, the front case enclosing the monitor by being connected with the rear cover.

10. The apparatus of claim 9, with said corrugated part having parallel grooves and ridges along the entire width of a front portion of said bottom plate.

11. The apparatus of claim 10, with said corrugated part having the ridges being a predetermined height, said corrugated part supporting a weight of the monitor.

12. The apparatus of claim 11, further comprising a securing protuberance formed on a front side of said side plate, said securing protuberance located in a position on said side plate corresponding to the second hole when said side plate is connected with said front plate.

13. The apparatus of claim 12, with one side of said protruded plate being moved to a position corresponding to said connecting protuberance of said side plate when the securing protuberance is connected to the second hole, said protruded plate being prevented from overturning sidewards by the one side of said protruded plate being caught on an inner side of said connecting protuberance, the securing protuberance being connected to the second hole preventing said front plate from overturning frontwards.

14. The apparatus of claim 13, further comprising a bead on a center of said bottom plate, the bead intensifying a bending rigidity of said bottom plate by traversing a width of said bottom plate, a punched fourth hole being formed in a shape of a rectangle on both ends of the bead accommodating folding of said side plate.

15. A method, comprising:

supporting a bottom plate by a stand of a monitor, said bottom plate having a corrugated part on said bottom plate, the monitor displaying variable video and being encased by a front cover connected to a rear cover forming an exterior to the monitor;

folding a front plate upwards and vertically with respect to said bottom plate along a second boundary line on said bottom plate, a first hole formed on a front portion of said side plate;

forming a protruding plate being on both sides of said front plate and a second hole of a predetermined size being formed in said protruding plate;

folding a side plate upwards and vertical with respect to said bottom plate along a second boundary line of said bottom plate, a third hole formed at a front part of the side plate and a connecting protuberance protruding from the third hole; and forming a rear plate on the back side of said bottom plate and folded vertically with respect to said bottom plate, said bottom, front, protruding, side, and rear plates accommodating a printed circuit board.

16. The method of claim 15, further comprising of connecting an upper plate rotatably and tiltably to a top of a stand of the monitor and supporting a bottom side of a rear cover of the monitor and said bottom plate.

17. The method of claim 16, with said upper plate having a front side contacting with a bottom side of a front case of the monitor, the front case enclosing the monitor by being connected with the rear cover.

18. The method of claim 17, with said corrugated part having parallel grooves and ridges along the entire width of a front portion of said bottom plate.

19. The method of claim 18, with said corrugated part having the ridges being a predetermined height, said corrugated part supporting a weight of the monitor.

20. The method of claim 19, further comprising of forming a securing protuberance on a front side of said side plate, said securing protuberance located in a position on said side plate corresponding to the second hole when said side plate is connected with said front plate.

21. The method of claim 20, further comprising of moving one side of said protruded plate to a position corresponding to said connecting protuberance of said side plate when the securing protuberance is connected to the second hole, said protruded plate being prevented from overturning sidewards by the one side of said protruded plate being caught on an inner side of said connecting protuberance, the securing protuberance being connected to the second hole preventing said front plate from overturning frontwards.

22. The method of claim 21, further comprising:
intensifying a bending rigidity of said bottom plate by traversing a width of said bottom plate along a center portion with a bead; and
punching a fourth hole in a shape of a rectangle on both ends of the bead accommodating folding of said side plate.

\* \* \* \* \*